United States Patent
Wei et al.

(10) Patent No.: US 11,493,977 B2
(45) Date of Patent: Nov. 8, 2022

(54) ELECTRONIC DEVICE AND POWER MANAGEMENT METHOD THEREFOR

(71) Applicant: Pegatron Corporation, Taipei (TW)

(72) Inventors: Chia-Liang Wei, Taipei (TW); Shiuan-Shuo Shiu, Taipei (TW); Ssu-Yun Chen, Taipei (TW); Jei-Hsiang Ma, Taipei (TW); Yi-Ming Lee, Taipei (TW); Chih-Wei Chung, Taipei (TW); Ming-You Jiang, Taipei (TW); Wei-Hao Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/249,733

(22) Filed: Mar. 11, 2021

(65) Prior Publication Data

US 2022/0043499 A1 Feb. 10, 2022

(30) Foreign Application Priority Data

Aug. 4, 2020 (TW) .................................. 109126332

(51) Int. Cl.
*G06F 1/3206* (2019.01)
*G06F 1/28* (2006.01)
*G06F 1/26* (2006.01)

(52) U.S. Cl.
CPC ............ *G06F 1/3206* (2013.01); *G06F 1/263* (2013.01); *G06F 1/28* (2013.01)

(58) Field of Classification Search
CPC ........... G06F 1/3206; G06F 1/263; G06F 1/28
See application file for complete search history.

(56) References Cited

U.S. PATENT DOCUMENTS 6,674,623 B1 * 1/2004 Abe ...................... G06F 1/206
257/E23.08
7,010,704 B2 3/2006 Yang et al.
(Continued)

FOREIGN PATENT DOCUMENTS

TW I225586 B 12/2004
TW 201107952 A 3/2011
(Continued)

OTHER PUBLICATIONS

TW Office Action dated Feb. 25, 2021 in corresponding Taiwan application (No. 109126332).

*Primary Examiner* — Phil K Nguyen
*Assistant Examiner* — Brian J Corcoran
(74) *Attorney, Agent, or Firm* — McClure, Qualey & Rodack, LLP (57) ABSTRACT

An electronic device includes a processor, a battery, a charging circuit, a controller, and an arithmetic logic unit. The processor is capable of operating at a preset frequency or a low frequency. The charging circuit is electrically connected to an external power supply and a battery and transmits a disconnection signal and to be powered by the battery when the external power supply and the charging circuit are changed from a connected state to a disconnected state. The controller is configured to transmit a first control signal when the external power supply and the charging circuit are changed from the connected state to the disconnected state. The arithmetic logic unit is configured to transmit a frequency reduction signal to the processor according to the disconnection signal and the first control signal, so that the processor reduces the preset frequency to the low frequency and operates at the low frequency.

14 Claims, 5 Drawing Sheets

(56) References Cited

U.S. PATENT DOCUMENTS

| | | | |
|---|---|---|---|
| 8,433,943 B2 | 4/2013 | Lin et al. | |
| 9,178,384 B2 | 11/2015 | Wu et al. | |
| 2003/0115494 A1* | 6/2003 | Cervantes | G06F 1/324 |
| | | | 713/322 |
| 2004/0236969 A1* | 11/2004 | Lippert | G06F 1/30 |
| | | | 713/300 |
| 2007/0255972 A1* | 11/2007 | Gaskins | G06F 1/3296 |
| | | | 713/500 |
| 2008/0104436 A1* | 5/2008 | Sawyers | G06F 1/3203 |
| | | | 713/323 |
| 2013/0124892 A1* | 5/2013 | Lu | G06F 1/30 |
| | | | 713/322 |
| 2013/0179712 A1 | 7/2013 | Tsai et al. | |
| 2015/0067364 A1* | 3/2015 | Nakazawa | G06F 1/3206 |
| | | | 713/320 |
| 2017/0185139 A1* | 6/2017 | Zwerg | G06F 3/0656 |

FOREIGN PATENT DOCUMENTS

| | | |
|---|---|---|
| TW | 201214095 A | 4/2012 |
| TW | 201329688 A | 7/2013 |
| TW | 201339818 A | 10/2013 |
| TW | 201347357 A | 11/2013 |

\* cited by examiner

ELECTRONIC DEVICE AND POWER MANAGEMENT METHOD THEREFOR

This application claims the benefit of Taiwan application Serial No. 109126332, filed Aug. 4, 2020, the subject matter of which is incorporated herein by reference.

BACKGROUND

Technical Field

The present invention relates to a device and a management method therefor, and in particular, to an electronic device and a power management method therefor.

Related Art

When an electronic device is connected to an external power supply, the external power supply can provide sufficient currents for the electronic device. When the electronic device is not connected to the external power supply, a battery inside the electronic device supplies power to the electronic device. However, when the external power supply and the electronic device are suddenly powered off, such as a sudden power failure or sudden falling of a plug that transmits an external power supply from the electronic device, unexpected shutdown may occur as a result of overload of the battery.

Therefore, there is an urgent need to provide an electronic device and a power management method that can improve the above conventional problems.

SUMMARY

In view of the above, the present invention provides an electronic device and a power management method therefor, which can alleviate the conventional problems.

An embodiment of the present invention provides an electronic device. An electronic device includes a processor, a battery, a charging circuit, a controller, and an arithmetic logic unit. The processor is capable of operating at a preset frequency or a low frequency. The charging circuit is electrically connected to an external power supply and the battery. The charging circuit is configured to transmit a disconnection signal and to be powered by the battery in response to the external power supply and the charging circuit being changed from a connected state to a disconnected state. The controller is configured to output a first control signal in response to the external power supply and the charging circuit being changed from the connected state to the disconnected state. The arithmetic logic unit is electrically connected to the charging circuit and the controller and is configured to transmit a frequency reduction signal to the processor according to the disconnection signal and the first control signal, so that the processor reduces the preset frequency to the low frequency and operates at the low frequency.

Another embodiment of the present invention provides a power management method of an electronic device. The power management method is adapted to the electronic device. The electronic device includes a processor, a battery, a charging circuit, and an arithmetic logic unit. The charging circuit is electrically connected to an external power supply and the battery. The processor is configured to operate at a preset frequency or a low frequency, and is powered by the battery in response to the charging circuit being not connected to the external power supply. The power management method includes the following steps: transmitting, by the charging circuit, a disconnection signal in response to the external power supply and the charging circuit being changed from a connected state to a disconnected state; transmitting, by the controller, a first control signal in response to the external power supply and the charging circuit being changed from the connected state to the disconnected state; and transmitting, by the arithmetic logic unit, a frequency reduction signal to the processor according to the disconnection signal and the first control signal, so that the processor reduces the preset frequency to the low frequency and operates at the low frequency.

In order to better understand the above and other aspects of the present invention, specific embodiments are listed and described in detail below with reference to the accompanied drawings.

DETAILED DESCRIPTION

Figure 1A:
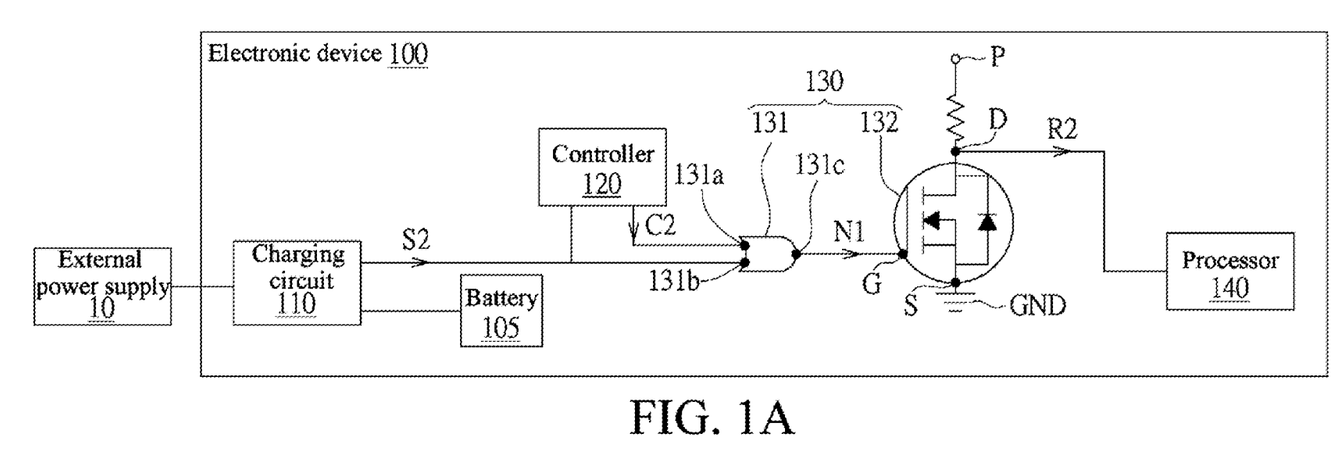
FIG. 1A illustrates a schematic diagram showing connection between an electronic device and an external power supply according to an embodiment of the present invention.
Figure 1B:
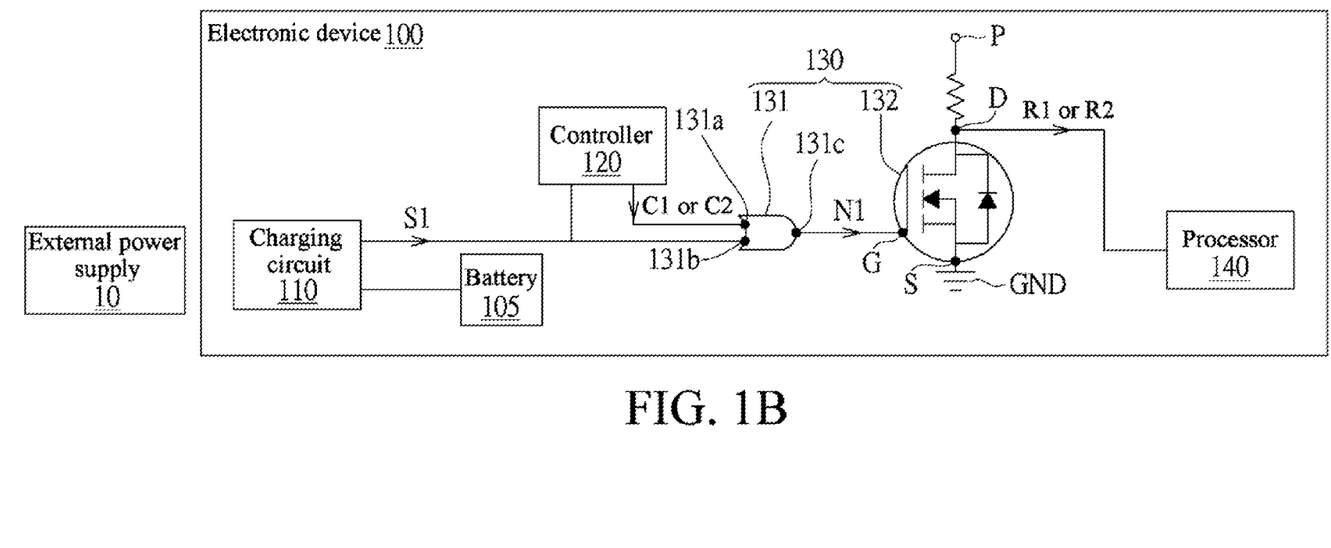
FIG. 1B illustrates a schematic diagram showing disconnection of the electronic device from the external power supply in FIG. 1A.
Figure 2:
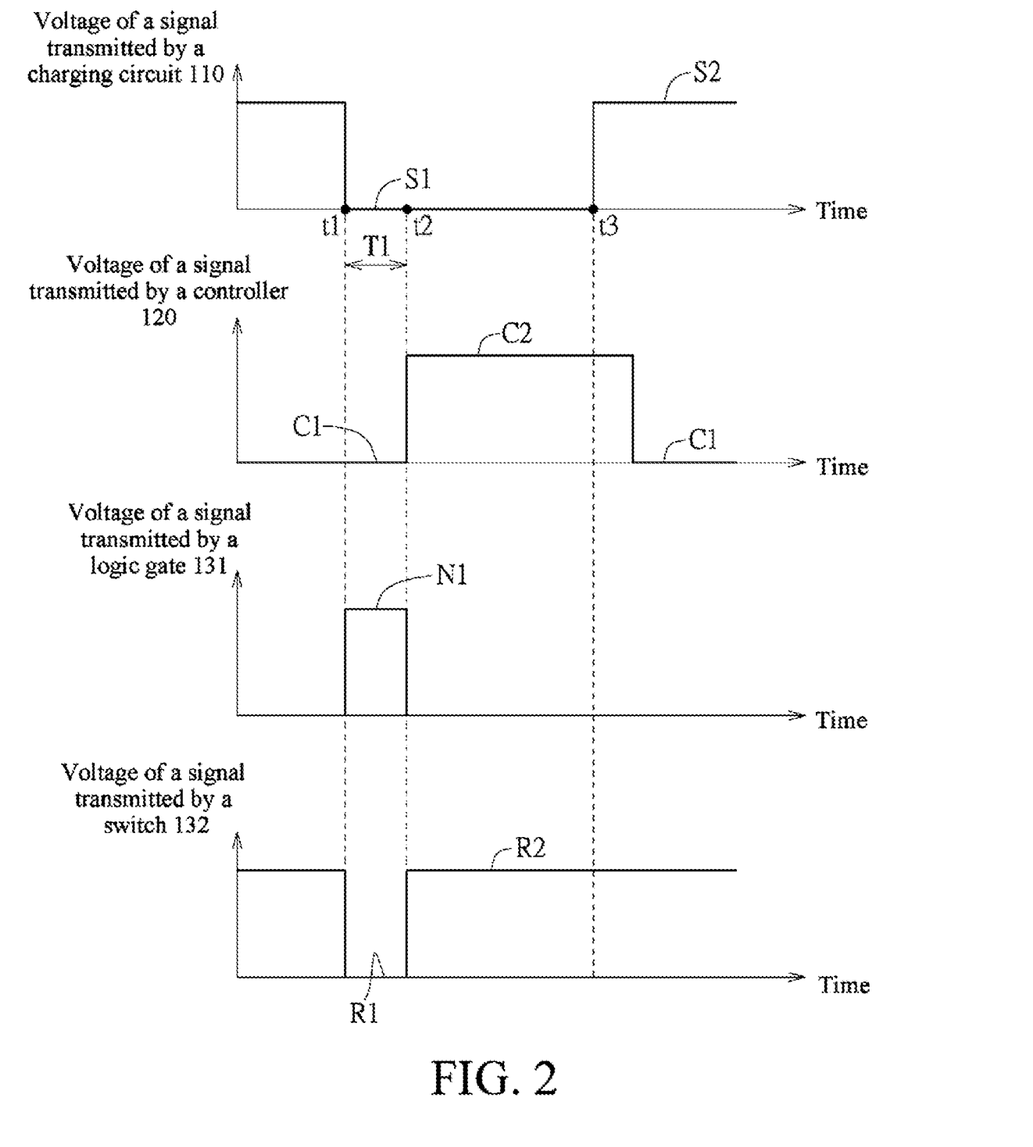
FIG. 2 to FIG. 4 illustrate timing diagrams of a signal transmitted by a charging circuit, a signal transmitted by a controller, and a signal transmitted by an arithmetic logic unit in a plurality of different embodiments in FIG. 1A.
Figure 3:
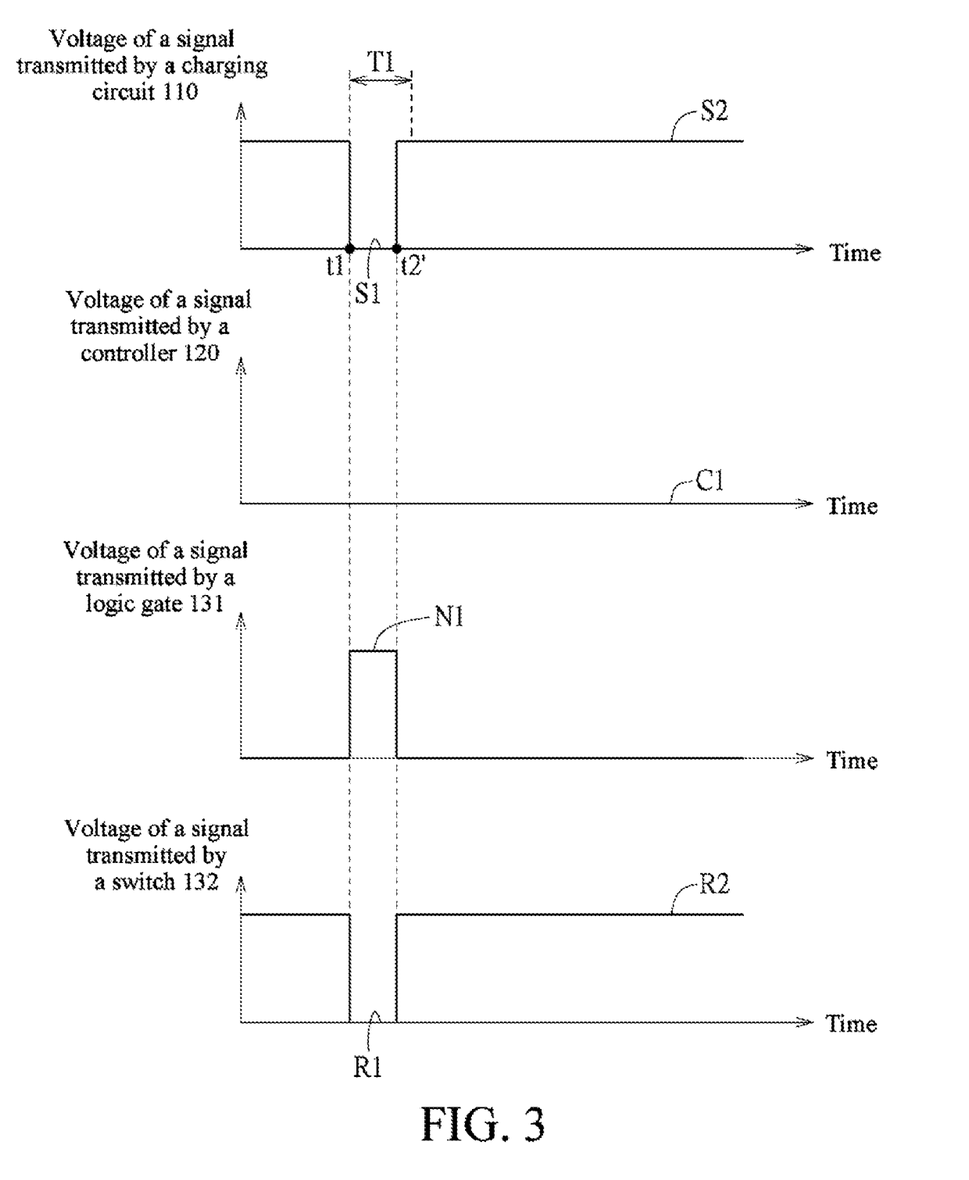
Figure 4:
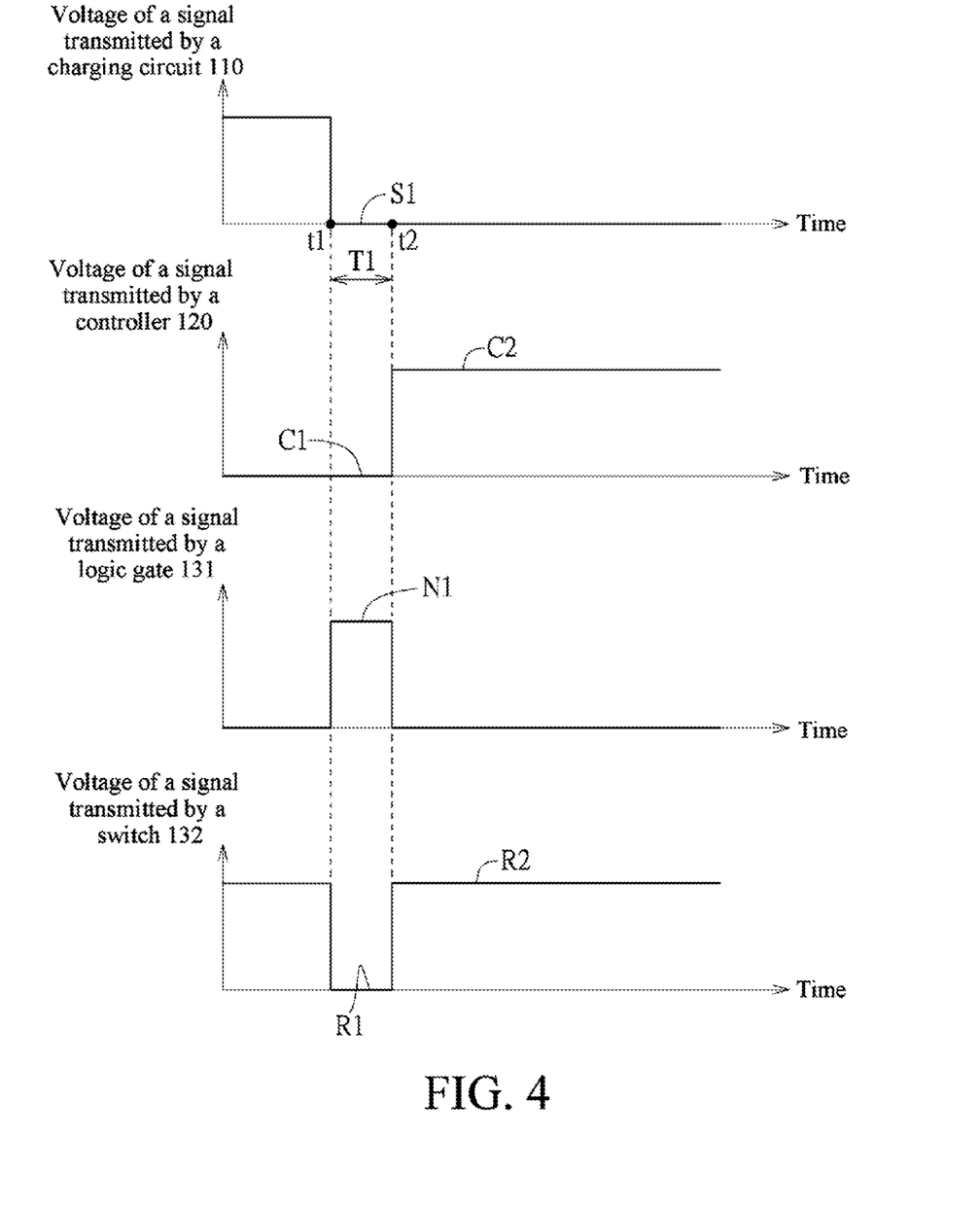

Referring to FIG. 1A, FIG. 1B, and FIG. 2 to FIG. 4, FIG. 1A illustrates a schematic diagram showing connection between an electronic device 100 and an external power supply 10 according to an embodiment of the present invention, FIG. 1B illustrates a schematic diagram showing disconnection of the electronic device 100 in FIG. 1A from the external power supply 10, and FIG. 2 to FIG. 4 illustrate timing diagrams of a signal transmitted by a charging circuit 110, a signal transmitted by a controller 120, and a signal transmitted by an arithmetic logic unit 130 in a plurality of different embodiments in FIG. 1A.

The electronic device 100 includes a battery 105, a charging circuit 110, a controller 120, an arithmetic logic unit 130, and at least one processor 140. In an embodiment, at least two of the charging circuit 110, the controller 120, the arithmetic logic unit 130, and the processor 140 may be integrated into a single element, or at least two of the charging circuit 110, the controller 120, and the arithmetic logic unit 130 may be integrated into the processor 140. In an embodiment, the controller 120 is, for example, an embedded controller (EC). The processor 140 is, for example, a central processing unit (CPU) and/or a graphics processing unit (GPU). A number of processors 140 is not limited in the embodiments of the present invention. One or more processors, such as two or more processors may be provided. In an embodiment, the processor 140 can operate at a preset frequency or a low frequency. The "preset frequency" herein is within a range, for example, between a highest operating frequency and a lowest operating frequency, and the "low frequency" is, for example, greater than at least the lowest operating frequency or is the lowest operating frequency. A specific value of the highest operating frequency and a specific value of the lowest operating frequency may depend on a specification and/or a type of the electronic device 100, which are not limited in the embodiments of the present invention.

The charging circuit 110 is configured to connect the external power supply 10 to the battery 105. When the charging circuit 110 is electrically connected to the external power supply 10, the charging circuit 110 may store power of the external power supply 10 into the battery 105. When the charging circuit 110 is not connected to the external power supply 10, the battery 105 supplies power to components inside the electronic device 100, for example, the charging circuit 110, the controller 120, the arithmetic logic unit 130, the processor 140, and/or other components to maintain normal operation of the electronic device 100.

In an embodiment, as shown in FIG. 2, the charging circuit 110 is configured to transmit a disconnection signal S1 to the arithmetic logic unit 130 when the external power supply 10 and the charging circuit 110 are changed from a connected state (as shown in FIG. 1A) to a disconnected state (as shown in FIG. 1B), for example, at a time point t1. The controller 120 is configured to transmit a first control signal C1 to the arithmetic logic unit 130 when the external power supply 10 and the charging circuit 110 are changed from the connected state to the disconnected state. The arithmetic logic unit 130 is electrically connected to the charging circuit 110 and the controller 120 and is configured to transmit a frequency reduction signal R1 to the processor 140 according to the disconnection signal S1 and the first control signal C1. The controller 120 is further configured to transmit a second control signal C2 to the processor 140 after a specific time T1 since the frequency reduction signal R1 was transmitted, for example, at a time point t2. The arithmetic logic unit 130 is further configured to transmit a recovery signal R2 to the processor 140 according to the disconnection signal S1 and the second control signal C2. In an embodiment, the processor 140 may perform frequency reduction according to the frequency reduction signal R1, that is, enable frequency reduction protection, so that the processor 140 reduces the preset frequency to the low frequency and operates at the low frequency, to prevent the battery 105 from being overloaded, thereby avoiding unexpected shutdown caused by overload of the battery, and cancels the frequency reduction protection procedure according to the recovery signal R2, so that the processor 140 is recovered from the low frequency to the preset frequency to operate.

Based on the above, when the external power supply 10 and the charging circuit 110 are changed from the connected state to the disconnected state, the processor 140 may reduce a frequency within a short response time or almost simultaneously, so that the frequency reduction protection can be enabled before the battery is overloaded, avoiding or reducing a probability of unexpected shutdown caused by overload of the battery. In detail, when the external power supply 10 and the charging circuit 110 are changed from the connected state to the disconnected state, for example, at the time point t1, the controller 120 can cause the processor 140 to quickly execute a frequency reduction procedure only by changing a signal state by using the charging circuit 110, for example, changing the signal state from a connection signal S2 to the disconnection signal S1 without changing a state of the control signal that is sent, that is, through maintaining the current first control signal C1. In addition, when the external power supply 10 and the charging circuit 110 are changed from the connected state to the disconnected state, the charging circuit 110 almost simultaneously transmits the disconnection signal S1 to the arithmetic logic unit 130. In this way, the processor 140 can reduce the frequency within a short response time or almost simultaneously. In an embodiment, when the external power supply 10 and the charging circuit 110 are changed from the connected state to the disconnected state, the processor 140 can reduce the frequency within 10 microseconds.

As shown in FIG. 2, the connection signal S2 and the second control signal C2 have a first voltage level, and the disconnection signal S1 and the first control signal C1 have a second voltage level. In an embodiment, the first voltage level is, for example, a high voltage level, and the second voltage level is, for example, a low voltage level.

As shown in FIG. 1A, FIG. 1B, and FIG. 2, the arithmetic logic unit 130 includes a logic gate 131 and a switch 132. The switch 132 electrically couples the logic gate 131 to the processor 140. The logic gate 131 includes a first input terminal 131a, a second input terminal 131b, and an output terminal 131c. The first input terminal 131a is configured to receive a control signal transmitted by the controller 120, for example, the first control signal C1 or the second control signal C2. The second input terminal 131b is configured to receive a connection status signal transmitted by the charging circuit 110, for example, the disconnection signal S1 or the connection signal S2. The logic gate 131 performs a logical operation on the received connection status signal and control signals, and outputs a corresponding output signal N1. The switch 132 includes a gate G, a drain D, and a source S. The gate G is electrically connected to the output terminal 131c of the arithmetic logic unit 130, the drain D is electrically connected to a power terminal P of the processor 140, and the source S is electrically connected to a ground terminal GND.

In this embodiment, the logic gate 131 is, for example, a NOR logic gate. As shown in FIG. 2, the logic gate 131 performs a NOR logic operation on the received connection status signal and control signals, and outputs the corresponding output signal N1. The output signal N1 of the logic gate 131 is inputted to the gate G of the switch 132. In this embodiment, the switch 132 is, for example, a metal oxide semiconductor field effect transistor (MOSFET), such as an NMOS. As shown in FIG. 2, the switch 132 is turned on according to a high-level region of the output signal N1 to output the frequency reduction signal R1 to the processor 140, and is turned off according to a low-level region of the output signal N1 to output the recovery signal R2 to the processor 140.

In addition, the above time interval T1 is, for example, any value between 2 seconds and 4 seconds, or may be longer or shorter. In this embodiment, the time interval T1 is preferably 3 seconds. The time interval T1 is sufficient for the processor 140 to complete the frequency reduction protection procedure. If the charging circuit 110 and the external power supply 10 maintain the disconnected state within the time interval T1, for example, at the time points t1-t2 shown in FIG. 2, which indicates that "the charging circuit 110 and the external power supply 10 are changed from the connected state to the disconnected state" is not an "unexpected event", the controller 120 transmits the second control signal C2 to the arithmetic logic unit 130. The "unexpected event" herein is, for example, an event such as a sudden power failure or sudden falling of a plug that transmits the external power supply 10 from the electronic device 100.

If the charging circuit 110 and the external power supply 10 are changed from the disconnected state to the connected state within the time interval T1, for example, at a time point t2' shown in FIG. 3, the controller 120 maintains transmitting of the first control signal C1 to the arithmetic logic unit 130, and the charging circuit 110 transmits the connection signal S2 to the arithmetic logic unit 130. The arithmetic logic unit 130 transmits the recovery signal R2 to the processor 140 according to the first control signal C1 and the connection signal S2. The processor 140 cancels the frequency reduction protection procedure according to the recovery signal R2.

In another embodiment, as shown in FIG. 1A, FIG. 1B, and FIG. 2, the charging circuit 110 is further configured to transmit the connection signal S2 to the arithmetic logic unit 130 when the external power supply 10 and the charging circuit 110 are changed from the disconnected state (as shown in FIG. 1B) to the connected state (as shown in FIG. 1A) after the specific time T1, for example, at a time point t3 in FIG. 2. The controller 120 is further configured to transmit the first control signal C1 to the arithmetic logic unit 130 when the external power supply 10 and the charging circuit 110 are changed from the disconnected state to the connected state. As shown in FIG. 2, the charging circuit 110 senses, at the time point t3, that the external power supply 10 and the charging circuit 110 are changed from the disconnected state to the connected state. Since the signal transmission takes time and the controller 120 also requires a time for response, the controller 120 transmits the first control signal C1 with a slight delay relative to the time point t3. The arithmetic logic unit 130 is further configured to transmit the recovery signal R2 to the processor 140 according to the connection signal S2 and the first control signal C1. The processor 140 cancels the frequency reduction protection procedure according to the recovery signal R2.

As shown in FIG. 2, due to characteristics of the arithmetic logic unit 130, even if the external power supply 10 and the charging circuit 110 are changed from the disconnected state to the connected state, the arithmetic logic unit 130 can maintain transmitting of the recovery signal R2 to the processor 140 if there is no requirement for frequency reduction protection. For example, after the time point t3 in FIG. 2, although the external power supply 10 and the charging circuit 110 are changed from the disconnected state to the connected state, the arithmetic logic unit 130 can maintain transmitting of the recovery signal R2 to the processor 140 due to no requirement for frequency reduction protection.

In another embodiment, as shown in FIG. 4, when the external power supply 10 and the charging circuit 110 maintain the disconnected state, for example, maintain the disconnected state after the time point t2, the charging circuit 110 maintains transmitting of the disconnection signal S1 to the arithmetic logic unit 130, and the controller 120 maintains transmitting of the second control signal C2 to the arithmetic logic unit 130 after the time point t2. The arithmetic logic unit 130 maintains transmitting of the recovery signal R2 to the processor 140 according to the disconnection signal S1 and the second control signal C2.

Figure 5:
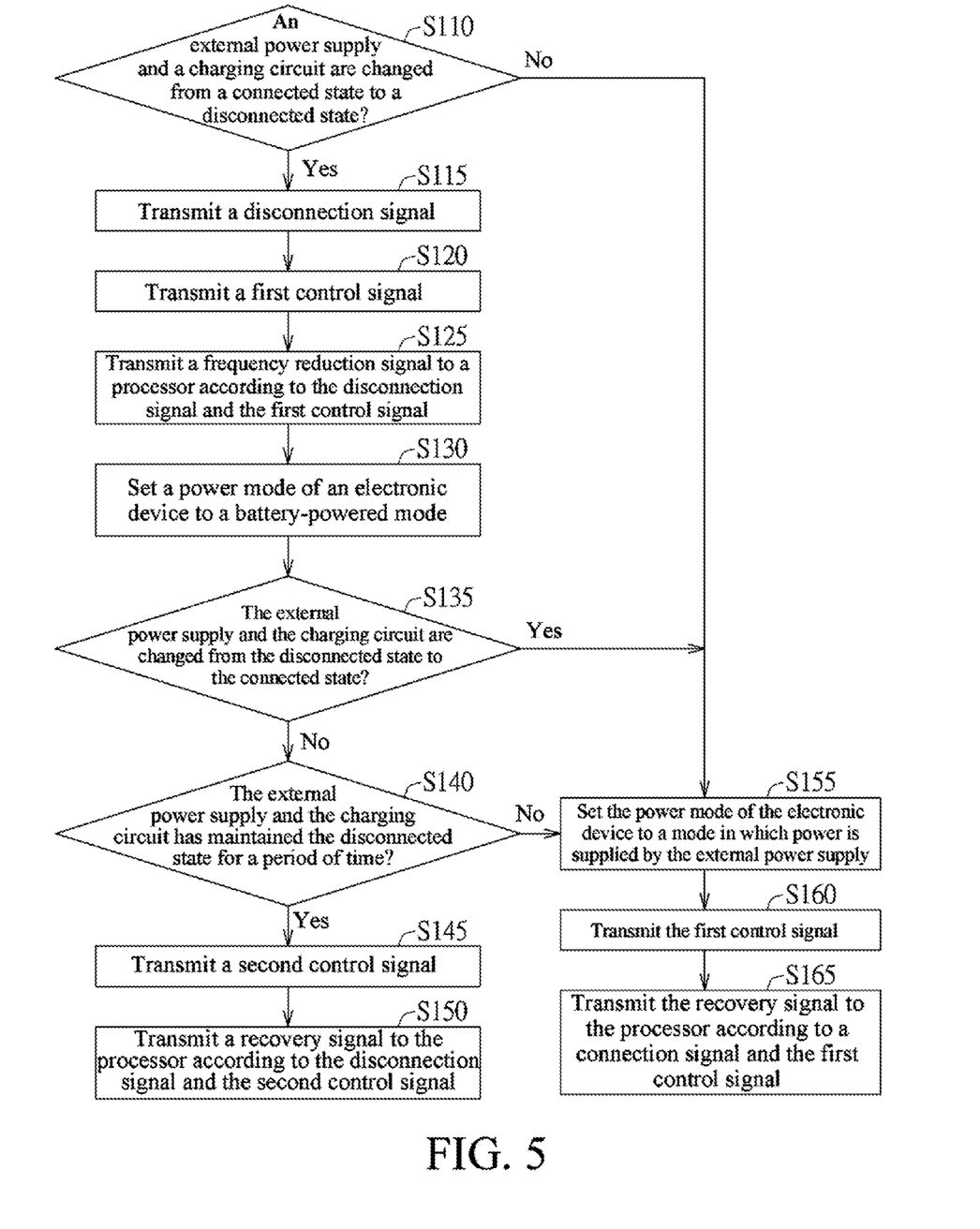
FIG. 5 illustrates a flowchart of a power management method of the electronic device in FIG. 1A.

FIG. 5 illustrates a flowchart of a power management method of the electronic device 100 in FIG. 1A.

In step S110, the charging circuit 110 determines whether the external power supply 10 and the charging circuit 110 are changed from the connected state to the disconnected state. If yes, the process proceeds to step S115, for example, at the time point t1 in FIG. 2. If no, the process proceeds to step S155, and a power mode of the electronic device 100 is set to a mode in which power is supplied by the external power supply. For example, the power mode of the electronic device 100 is changed from a battery-powered mode to a mode in which power is supplied by the external power supply, or an original mode in which power is supplied by the external power supply is maintained.

In step S115, for example, at the time point t1 in FIG. 2, the external power supply 10 and the charging circuit 110 are changed from the connected state to the disconnected state. Therefore, the charging circuit 110 transmits the disconnection signal S1 to the arithmetic logic unit 130. Then, in step S120, the controller 120 transmits the first control signal C1 to the arithmetic logic unit 130. Then, the arithmetic logic unit 130 transmits the frequency reduction signal R1 to the processor 140 according to the disconnection signal S1 and the first control signal C1. Then, the processor 140 enables frequency reduction protection according to the frequency reduction signal R1, so that the processor 140 reduces the preset frequency to the low frequency and operates at the low frequency, to prevent the battery 105 from being overloaded, thereby avoiding unexpected shutdown caused by overload of the battery.

In step S130, the power mode of the electronic device 100 is set to the battery-powered mode. For example, the controller 120 instructs a basic input/output system (BIOS) (not shown) of the electronic device 100 to set the power mode of the electronic device 100 to the battery-powered mode.

In step S135, referring to FIG. 3 at the same time, within the specific time T1 since the frequency reduction signal R1 was transmitted, the charging circuit 110 determines whether the external power supply 10 and the charging circuit 110 are changed from the disconnected state to the connected state. If yes, it indicates that the external power supply 10 and the charging circuit 110 are connected again within the specific time T1. If no, the process proceeds to step S155, and the power mode of the electronic device 100 is set to the mode in which power is supplied by the external power supply. For example, at the time point t2' in FIG. 3, the external power supply 10 and the charging circuit 110 are changed from the disconnected state to the connected state, which indicates that the external power supply 10 and the charging circuit 110 are connected again after the unexpected disconnection within the specific time T1. In this case, the process proceeds to step S155, and the power mode of the electronic device 100 is set to the mode in which power is supplied by the external power supply.

If no, it indicates that the external power supply 10 and the charging circuit 110 still maintain a disconnected state. For example, between the time point t1 and the time point t2 in FIG. 2, the external power supply 10 and the charging circuit 110 maintain the disconnected state. In this case, the process proceeds to step S140.

In step S140, after the specific time T1 since the frequency reduction signal R1 was transmitted, for example, at the time point t2 shown in FIG. 2, the charging circuit 110 determines whether the external power supply 10 and the charging circuit 110 maintain the disconnected state. If yes, the process proceeds to step S145. The above specific time T1 is, for example, between 2 seconds and 4 seconds, such as 3 seconds, or may be longer or shorter.

The time interval T1 is sufficient for the processor 140 to complete the frequency reduction procedure. If the charging circuit 110 and the external power supply 10 maintain the disconnected state within the time interval T1, which indicates that "the charging circuit 110 and the external power supply 10 are changed from the connected state to the disconnected state" is not an "unexpected event", the process proceeds to step S145.

In step S145, the controller 120 transmits a second control signal C2. Then, the process proceeds to step S150. The arithmetic logic unit 130 transmits the recovery signal R2 to the processor 140 according to the disconnection signal S1 and the second control signal C2. The processor 140 cancels the frequency reduction protection procedure according to the recovery signal R2, so that the processor 140 recovers the preset frequency from the low frequency and operates at the low frequency and operates at the preset frequency.

In step S140, if the external power supply 10 and the charging circuit 110 do not maintain the disconnected state within the specific time T1, which indicates that the external power supply 10 and the charging circuit 110 are connected again, for example, the external power supply 10 and the charging circuit 110 are changed from the disconnected state to the connected state at a time point t2' in FIG. 3, the process proceeds to step S155, and the power mode of the electronic device 100 is set to the mode in which power is supplied by the external power supply.

In step S155, the power mode of the electronic device 100 is set to a mode in which power is supplied by the external power supply in such a way, for example, the controller 120 instructs the BIOS of the electronic device 100 to set the power mode of the electronic device 100 to the mode in which power is supplied by the external power supply. Then, in step S160, the controller 120 transmits the first control signal C1. Then, in step S165, the arithmetic logic unit 130 transmits the recovery signal R2 to the processor 140 according to the connection signal S2 and the first control signal C1.

Based on the above, the power management method of the electronic device 100 in the embodiments of the present invention can reduce a capacity of the battery 105 and/or a number of cells. For example, compared with a conventional power management method, the power management method of the electronic device 100 in the embodiments of the present invention can reduce the capacity of the battery from 60 watt-hours (Whr) to 42 watt-hours and/or reduce the number of cells from 3 to 2.

Based on the above, although the present invention is disclosed in the above embodiments, the embodiments are not intended to limit the present invention. Those with ordinary knowledge in the technical field to which the present invention belongs can make various changes and refinements without departing from the spirit and scope of the present invention. Therefore, the protection scope of the present invention is subject to scope defined by the attached claims.

What is claimed is:

1. An electronic device, comprising:
a processor capable of operating at a preset frequency or a low frequency, wherein the low frequency is less than the preset frequency;
a battery;
a charging circuit electrically connected to an external power supply and the battery, wherein the charging circuit is configured to transmit a disconnection signal and to be powered by the battery in response to the external power supply and the charging circuit being changed from a connected state to a disconnected state;
a controller configured to transmit a first control signal in response to the external power supply and the charging circuit being changed from the connected state to the disconnected state; and
an arithmetic logic unit electrically connected to the charging circuit and the controller and configured to transmit a frequency reduction signal to the processor according to logical operation on the disconnection signal and the first control signal, so that the processor reduces the preset frequency to the low frequency and operates at the low frequency;
wherein the controller is an embedded controller (EC);
wherein the controller is configured to transmit a second control signal to the processor, through the arithmetic logic unit, after a specific time since the frequency reduction signal was transmitted; and the arithmetic logic unit is configured to transmit a recovery signal to the processor according to the disconnection signal and the second control signal, so that the processor recovers the preset frequency from the low frequency and operates at the preset frequency.

2. The electronic device according to claim 1, wherein the specific time is between 2 seconds and 4 seconds.

3. The electronic device according to claim 1, wherein the controller is configured to transmit the second control signal to the processor in response to the external power supply and the charging circuit being changed from the disconnected state to the connected state.

4. The electronic device according to claim 1, wherein the controller transmits the second control signal to the processor in response to the external power supply and the charging circuit being not changed from the disconnected state to the connected state and still maintaining the disconnected state after the specific time since the frequency reduction signal was transmitted.

5. The electronic device according to claim 1, wherein the arithmetic logic unit is configured to perform a NOR logic operation on the disconnection signal and the first control signal and transmit the frequency reduction signal to the processor according to a result of the NOR logic operation.

6. The electronic device according to claim 1, wherein the arithmetic logic unit is configured to perform a NOR logic operation on the disconnection signal and the second control signal, and transmit the recovery signal to the processor according to a result of the NOR logic operation.

7. The electronic device according to claim 1, wherein the preset frequency is between a highest operating frequency and a lowest operating frequency, and the low frequency is the lowest operating frequency.

8. A power management method, adapted to an electronic device, wherein the electronic device comprises a processor, a battery, a charging circuit, a controller and an arithmetic logic unit, wherein the charging circuit is electrically connected to an external power supply and the battery, the processor is configured to operate at a preset frequency or a low frequency and to be powered by the battery in response to the charging circuit being not connected to the external power supply, and the power management method comprises:
transmitting, by the charging circuit, a disconnection signal in response to the external power supply and the charging circuit being changed from a connected state to a disconnected state;
transmitting, by the controller, a first control signal in response to the external power supply and the charging circuit being changed from the connected state to the disconnected state; and
transmitting, by the arithmetic logic unit, a frequency reduction signal to the processor according to logical operation on the disconnection signal and the first control signal, so that the processor reduces the preset frequency to the low frequency and operates at the low frequency;
wherein the controller is an embedded controllers;
wherein the power management method further comprises:

transmitting, by the controller, a second control signal to the processor, through the arithmetic logic unit, after a specific time since the frequency reduction signal was transmitted; and transmitting, by the arithmetic logic unit, a recovery signal to the processor according to the disconnection signal and the second control signal, so that the processor recovers the preset frequency from the low frequency and operates at the preset frequency.

9. The power management method according to claim 8, wherein the specific time is between 2 seconds and 4 seconds.

10. The power management method according to claim 8, further comprising:

transmitting, by the controller, the second control signal to the processor in response to the external power supply and the charging circuit being changed from the disconnected state to the connected state.

11. The power management method according to claim 8, further comprising:

transmitting, by the controller, the second control signal to the processor in response to the external power supply and the charging circuit being not changed from the disconnected state to the connected state and still maintaining the disconnected state after the specific time since the frequency reduction signal was transmitted.

12. The power management method according to claim 8, wherein the step of transmitting the frequency reduction signal to the processor according to the disconnection signal and the first control signal comprises:

performing, by the arithmetic logic unit, a NOR logic operation on the disconnection signal and the first control signal; and transmitting, by the arithmetic logic unit, the frequency reduction signal to the processor according to a result of the NOR logic operation.

13. The power management method according to claim 8, wherein the step of transmitting the recovery signal to the processor according to the disconnection signal and the second control signal comprises:

performing, by the arithmetic logic unit, a NOR logic operation on the disconnection signal and the second control signal; and transmitting, by the arithmetic logic unit, the recovery signal to the processor according to a result of the NOR logic operation.

14. The power management method according to claim 8, wherein the preset frequency is between a highest operating frequency and a lowest operating frequency, and the low frequency is the lowest operating frequency.

\* \* \* \* \*